(12) United States Patent
Minezaki et al.

(10) Patent No.: US 8,357,742 B2
(45) Date of Patent: Jan. 22, 2013

(54) VIBRATION DAMPING MATERIAL

(75) Inventors: Takuya Minezaki, Kanagawa (JP);
Takeo Hayashi, Kanagawa (JP); Satoshi Yoshinaka, Kanagawa (JP); Kazuaki Mukasa, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 317 days.

(21) Appl. No.: 12/740,823

(22) PCT Filed: Nov. 11, 2008

(86) PCT No.: PCT/JP2008/070443
§ 371 (c)(1),
(2), (4) Date: Apr. 30, 2010

(87) PCT Pub. No.: WO2009/063837
PCT Pub. Date: May 22, 2009

(65) Prior Publication Data
US 2010/0234509 A1    Sep. 16, 2010

(30) Foreign Application Priority Data
Nov. 13, 2007 (JP) ................................. 2007-294056

(51) Int. Cl.
C08K 3/22    (2006.01)
(52) U.S. Cl. ......... 524/413; 524/430; 524/449; 524/604
(58) Field of Classification Search ................ 524/413, 524/430, 449, 604
See application file for complete search history.

(56) References Cited

U.S. PATENT DOCUMENTS

| | | | |
|---|---|---|---|
| 4,942,219 A | 7/1990 | Yatsuka et al. | |
| 5,183,863 A | 2/1993 | Nakamura et al. | |
| 5,411,810 A | 5/1995 | Hirakouchi et al. | |
| 2005/0215703 A1 | 9/2005 | Mukasa et al. | |
| 2009/0278293 A1* | 11/2009 | Yoshinaka et al. | 267/140.11 |

FOREIGN PATENT DOCUMENTS

| | | |
|---|---|---|
| EP | 1571176 | 9/2005 |
| EP | 1921122 | 5/2008 |
| JP | 61-197628 | 9/1986 |
| JP | 62-295949 | 12/1987 |
| JP | 63-056522 | 3/1988 |
| JP | 2623316 | 8/1989 |
| JP | 2925636 | 11/1991 |
| JP | 2613502 | 12/1992 |
| JP | 5-230195 | 9/1993 |
| JP | 3117798 | 1/1994 |
| JP | 6-31853 | 2/1994 |
| JP | 3311849 | 7/1995 |
| JP | 3075905 | 8/1995 |
| JP | 3780385 | 7/1997 |
| JP | 2003-221496 | 8/2003 |
| JP | 2004-143324 | 5/2004 |
| JP | 2006-52377 | 2/2006 |
| JP | 2007-56103 | 3/2007 |
| JP | 2007-56104 | 3/2007 |
| WO | 2007/026653 | 3/2007 |
| WO | 2008/018444 | 2/2008 |

OTHER PUBLICATIONS

International Search Report that issued with respect to PCT/JP2008/070443, mailed Dec. 22, 2008.
English language Abstract of JP 7-179735, corresponding to JP 3311849, Jul. 18, 1995.
English language Abstract of JP 9-194743, corresponding to 3780385, Jul. 29, 1997.
English language Abstract of JP 6-016913, corresponding to 3117798, Jan. 25, 1994.
English language Abstract of JP 7-224213, corresponding to JP 3075905, Aug. 22, 1995.
English language Abstract of JP 3-263457, corresponding to JP 2925636, Nov. 22, 1991.
English language Abstract of JP 1-198622, corresponding to JP 2623316, Aug. 10, 1989.
English language Abstract of JP 4-353514, corresponding to JP 2613502, Dec. 8, 1992.

\* cited by examiner

*Primary Examiner* — Ling Choi
*Assistant Examiner* — Wenwen Cai
(74) *Attorney, Agent, or Firm* — Greenblum & Bernstein, P.L.C.

(57) ABSTRACT

A resin composition for a vibration damping material, comprising a polyester resin mainly formed of a dicarboxylic acid constitutional unit and a diol constitutional unit; and a filler, in which the polyester resin contains: a dicarboxylic acid constitutional unit (A) mainly derived from an aromatic dicarboxylic acid, in particular, isophthalic acid; a diol constitutional unit (B) mainly derived from ethylene glycol; and a constitutional unit (C) formed of an aliphatic dicarboxylic acid, an aliphatic diol, and/or an aliphatic hydroxycarboxylic acid each having 5 or more carbon atoms, and the resin composition contains, as the filler, a flake-like or plate-like filler (D) and a filler (E) made of a particulate metal oxide.

10 Claims, No Drawings

VIBRATION DAMPING MATERIAL

TECHNICAL FIELD

The present invention relates to a vibration damping material containing a polyester resin and an inorganic filler, and more specifically, to a resin composition for a vibration damping material and a vibration damping material which exert high vibration damping performance in a wide temperature region and are excellent in toughness and processability.

BACKGROUND ART

In general, a vibration damping material for absorbing vibration energy is used in areas where vibration occurs, in a vehicle, a railway car, aircraft, a household appliance, an OA apparatus, a precision apparatus, a building machine, a construction/building, shoes, a sport gear, and the like, in order to damp the vibration.

As a material for absorbing vibration energy, the material being used as a vibration damping material, there have been known, in addition to a polymeric material, a lead core and an oil damper that utilize plastic deformation, for example. However, lead is included in substances to be controlled under environment-related regulations that have been established in recent years, and hence the use of the lead core has been becoming difficult. Meanwhile, the oil dumper has problems in that the direction in which vibration is absorbed is limited and in that a small oil dumper is difficult to produce because the oil dumper needs a complex construction. Thus, a vibration damping material utilizing a polymeric material is widely used in general as a material that can be easily used without causing the above-mentioned problems.

As the kind of a polymeric material that is used as a vibration damping material, there are disclosed rubber materials such as butyl rubber and NBR, soft vinyl chloride-based materials each obtained by adding a plasticizer to a vinyl chloride-based resin, polyesters, polyamides, polyvinyl compounds, polyurethanes, polyolefins, and the like. In addition, there are disclosed many forms of resin compositions each obtained by adding a filler made up of an inorganic substance or an organic substance for improving vibration dumping performance, mechanical strength, and durability.

There are disclosed, particularly as a vibration dumping material that includes a polyester resin as a base substance, for example, a vibration dumping material made up of a polyester resin alone (Patent Documents 1, 2, and 3), a vibration dumping material obtained by blending polyester resins having different glass transition temperatures with each other (Patent Document 4), a vibration dumping material obtained by adding a curing agent to the vibration dumping material in Patent Document 4 (Patent Documents 5, 6, 7, and 8), and a resin composition obtained by adding an inorganic substance (Patent Document 9), in particular, adding a glass fiber (Patent Documents 10 and 11), to the above-mentioned polyester resin or to a complex resin produced by combining the polyester resin with another resin. However, those materials known until now do not necessarily satisfy all levels required from the standpoints of vibration dumping performance, processability, toughness, and the like, and hence those materials need further technical improvements.

Meanwhile, there is disclosed a resin composition in which mica is dispersed in a polyester resin, in particular, a polyester resin characterized in that the number of skeleton carbon atoms between functional groups is odd (Patent Document 12). The resin composition has high vibration dumping performance at around room temperature, and is a promising vibration dumping material. Thus, the resin composition can be used as a material exerting high vibration dumping performance in a region having a higher temperature than room temperature by adjusting the composition of monomers each constituting the polyester resin. However, there remains a problem that because the flexibility of the polyester resin is insufficient, when the resin undergoes processing, the resin produces breaks and cracks. Thus, it is not possible to say that the polyester resin sufficiently satisfies the requirement that high vibration dumping performance should be exerted in a wide temperature region.

Patent Document 1: JP-A-62-295949
Patent Document 2: JP-A-5-230195
Patent Document 3: JP-B-3311849
Patent Document 4: JP-A-6-031853
Patent Document 5: JP-A-2003-221496
Patent Document 6: JP-B-2613502
Patent Document 7: JP-B-2623316
Patent Document 8: JP-B-3117798
Patent Document 9: JP-B-3780385
Patent Document 10: JP-B-2925636
Patent Document 11: JP-B-3075905
Patent Document 12: JP-A-2006-052377

DISCLOSURE OF THE INVENTION

Problems to be solved by the Invention

An object of the present invention is to provide a resin composition for a vibration damping material and a vibration damping material which exert high vibration damping performance in a wide temperature region and are excellent in toughness and processability, by using a polymeric material mainly containing a polyester resin.

Means for Solving the Problems

The inventors of the present invention have intensively studied to accomplish the above-mentioned object. As a result, the inventors have found that a resin composition containing a specific polyester resin and an inorganic filler exerts high vibration damping performance as a vibration damping material, and hence the resin composition meets the above-mentioned object, leading to the present invention.

That is, the present invention provides the resin composition for a vibration damping material and the vibration damping material, both described below.

1. A resin composition for a vibration damping material, including: a polyester resin mainly formed of a dicarboxylic acid constitutional unit and a diol constitutional unit; and a filler, in which:
  (1) the polyester resin contains 50 mol % or more of a dicarboxylic acid constitutional unit (A) derived from an aromatic dicarboxylic acid in all dicarboxylic acid constitutional units, and contains 70 mol % or more of a dicarboxylic acid constitutional unit derived from isophthalic acid in the dicarboxylic acid constitutional unit (A) derived from an aromatic dicarboxylic acid;
  (2) the polyester resin contains 60 mol % or more of a diol component constitutional unit (B) derived from ethylene glycol in all dial constitutional units;
  (3) the polyester resin contains a constitutional unit (C) formed of an aliphatic dicarboxylic acid, an aliphatic diol, and/or an aliphatic hydroxycarboxylic acid all of which have 5 or more carbon atoms, and the total of the constitutional unit is 5 to 25 mol %;

(4) the polyester resin contains a total of 75 mol % or more of the constitutional units (A), (B), and (C) in all constitutional units of the polyester resin;
(5) the intrinsic viscosity of the polyester resin, which is measured at 25° C. in a mixed solvent of tetrachloroethane and phenol at a mass ratio of 1 to 1, is 0.2 to 2.0 dL/g;
(6) the calorie of crystallization exotherm peak under temperature drop conditions of the polyester resin, which is measured by a differential scanning calorimeter, is 5 J/g or less;
(7) the resin composition contains, as the filler, a flake-like or plate-like filler (D) and a filler (E) made of a particulate metal oxide, in which the content of the filler (D) is 18 to 70 mass %, the content of the filler (E) is 2 to 20 mass %, and the total content of the fillers (D) and (E) is 20 to 80 mass %; and
(8) the maximum value of a loss elastic modulus of the resin composition is $5 \times 10^8$ [N/m$^2$] or more.

2. The resin composition for a vibration damping material according to the above item 1, including 90 mol % or more of the dicarboxylic acid constitutional unit derived from isophthalic acid in the dicarboxylic acid constitutional unit (A) derived from an aromatic dicarboxylic acid.

3. The resin composition for a vibration damping material according to the above item 1, in which the constitutional unit (C) includes one or more kinds of compounds selected from a group consisting of azelaic acid, sebacic acid, 3-methyl-1,5-pentanediol, 1,6-hexanediol, and triethylene glycol.

4. The resin composition for a vibration damping material according to the above item 3, in which the constitutional unit (C) includes one or more kinds of compounds selected from a group consisting of azelaic acid, sebacic acid, and triethylene glycol.

5. The resin composition for a vibration damping material according to the above item 4, in which the constitutional unit (C) includes azelaic acid.

6. The resin composition for a vibration damping material according to the above item 1, including a total of 90 mol % or more of the constitutional units (A), (B), and (C) in all constitutional units of the polyester resin;

7. The resin composition for a vibration damping material according to the above item 1, in which the filler (D) includes a mica flake.

8. The resin composition for a vibration damping material according to the above item 1, in which the filler (E) includes one or more kinds of particulate metal oxides selected from a group consisting of titanium dioxide, zinc oxide, calcium oxide, iron oxide, aluminum oxide, and magnesium oxide.

9. The resin composition for a vibration damping material according to the above item 8, in which the filler (E) includes titanium dioxide.

10. A vibration damping material, including the resin composition for a vibration damping material according to any one of the above items 1 to 9.

EFFECTS OF THE INVENTION

The resin composition for a vibration damping material of the present invention is capable of providing a resin composition for a vibration damping material and a vibration damping material, the composition and material exerting high vibration damping performance in a wide temperature region, in particular, exerting sufficient vibration damping performance even in a region having a higher temperature than room temperature, and being excellent in toughness and processability. Thus, the present invention has a great industrial significance.

BEST MODE FOR CARRYING OUT THE INVENTION

The present invention is hereinafter described in detail.
A resin composition for a vibration damping material of the present invention is a resin composition obtained by dispersing a filler into a polyester resin mainly formed of dicarboxylic acid constitutional units and diol constitutional units, and satisfies the following conditions.
(1) The polyester resin contains 50 mol % or more of a dicarboxylic acid constitutional unit (A) derived from an aromatic dicarboxylic acid in all dicarboxylic acid constitutional units, and contains 70 mol % or more of a dicarboxylic acid constitutional unit derived from isophthalic acid in the dicarboxylic acid constitutional unit (A) derived from an aromatic dicarboxylic acid.
(2) The polyester resin contains 60 mol % or more of a diol constitutional unit (B) derived from ethylene glycol in all diol constitutional units.
(3) The polyester resin contains a constitutional unit (C) formed of an aliphatic dicarboxylic acid, an aliphatic diol, and/or an aliphatic hydroxycarboxylic acid all of which have 5 or more carbon atoms, and a total of the constitutional unit is 5 to 25 mol %.
(4) The polyester resin contains a total of 75 mol % or more of the constitutional units (A), (B), and (C) in all constitutional units of the polyester resin.
(5) An intrinsic viscosity of the polyester resin, which is measured at 25° C. in a mixed solvent of tetrachloroethane and phenol at a mass ratio of 1 to 1, is 0.2 to 2.0 dL/g.
(6) A calorie of crystallization exotherm peak under temperature drop conditions of the polyester resin, which is measured by a differential scanning calorimeter, is 5 J/g or less.
(7) The resin composition contains, as the filler, a flake-like or plate-like filler (D) and a filler (E) made of a particulate metal oxide, in which a content of the filler (D) is 18 to 70 mass %, a content of the filler (E) is 2 to 20 mass %, and a total content of the fillers (D) and (E) is 20 to 80 mass %.
(8) A maximum value of a loss elastic modulus of the resin composition is $5 \times 10^8$ [N/m$^2$] or more.

The resin used for the resin composition for a vibration damping material of the present invention is a polyester resin mainly formed of a dicarboxylic acid constitutional unit and a diol constitutional unit. The total of the dicarboxylic acid constitutional unit and the diol constitutional unit accounts for preferably 75 mol % or more of all constitutional units in the polyester resin, or more preferably 90 mol % or more.

The dicarboxylic acid constitutional unit (A) derived from an aromatic dicarboxylic acid accounts for 50 mol % or more of all dicarboxylic acid constitutional units in the polyester resin, or preferably 60 mol % or more. The case where the dicarboxylic acid constitutional unit (A) derived from an aromatic dicarboxylic acid accounts for less than 50 mol % is not preferred, because reactivity in the resin polymerization is insufficient.

In addition, an isophthalic acid constitutional unit accounts for 70 mol % or more of the dicarboxylic acid constitutional unit (A) derived from an aromatic dicarboxylic acid, or preferably 90 mol % or more. When the isophthalic acid constitutional unit accounts for 70 mol % or more, a filler for enhancing the vibration damping performance of the resin composition can be dispersed in the polyester resin to a larger extent.

If isophthalic acid accounts for 70 mol % or more of the dicarboxylic acid constitutional unit (A) derived from an aromatic dicarboxylic acid, other aromatic dicarboxylic acids may also be used. Specific examples of the aromatic dicarboxylic acid other than isophthalic acid include conventionally known aromatic dicarboxylic acids such as phthalic acid, terephthalic acid, naphthalenedicarboxylic acid, diphenyldicarboxylic acid, and diphenyl ether dicarboxylic acid, and an alkyl substitute, a halogen substitute, and an alkoxy substitute of those dicarboxylic acids. In the polyester resin to be used in the present invention, the dicarboxylic acid constitutional unit (A) derived from an aromatic dicarboxylic acid may include one or two or more kinds of constitutional units of aromatic dicarboxylic acids other than isophthalic acid.

The diol component constitutional unit (B) derived from ethylene glycol accounts for 60 mol % or more of all diol constitutional units in the polyester resin, or more preferably 70 mol % or more. When the diol component constitutional unit (B) derived from ethylene glycol is adjusted so as to account for 60 mol % or more, a resin composition excellent in formability, toughness, and vibration dumping performance is obtained.

The polyester resin contains a constitutional unit (C) formed of an aliphatic dicarboxylic acid, an aliphatic diol, and/or an aliphatic hydroxycarboxylic acid all of which have 5 or more carbon atoms, and the content of the constitutional unit (C) is 5 to 25 mol %, or preferably 10 to 20 mol %. In the case where the content of the constitutional unit (C) is 25 mol % or more, the resin composition cannot exert sufficient performance in a region having a higher temperature than room temperature. In the case where the content of the constitutional unit is less than 5 mol %, the material has insufficient toughness. Thus, both cases are not preferred.

The constitutional unit (C) formed of an aliphatic dicarboxylic acid, an aliphatic diol, and/or an aliphatic hydroxycarboxylic acid all of which have 5 or more carbon atoms refers to a unit in which the total number of carbon atoms of an aliphatic dicarboxylic acid component, an aliphatic diol component, or an aliphatic hydroxycarboxylic acid component that constitute the polyester resin is 5 or more, the aliphatic dicarboxylic acid component, the aliphatic diol component, or the aliphatic hydroxycarboxylic acid component being included in the main chain and side chains present between functional groups. In this case, the carbon atom included in a carboxylic group forming an ester bond is assumed to be included in a dicarboxylic acid constitutional unit or a hydroxycarboxylic acid constitutional unit. The largest number of the carbon atoms in the constitutional unit (C) formed of an aliphatic dicarboxylic acid, an aliphatic diol, and/or an aliphatic hydroxycarboxylic acid is not particularly limited, but 17 or less carbon atoms are preferred.

Specific examples of the component corresponding to the above-mentioned constitutional unit (C) include: aliphatic dicarboxylic acids such as 2-methylsuccinic acid, glutaric acid, adipic acid, pimelic acid, suberic acid, azelaic acid, dodecanedioic acid, undecanedioic acid, dodecanedioic acid, brassylic acid, 1,3-cyclohexane dicarboxylic acid, 1,4-cyclohexane dicarboxylic acid, decalin dicarboxylic acid, norbornane dicarboxylic acid, tricyclodecane dicarboxylic acid, pentacyclododecane dicarboxylic acid, isophorone dicarboxylic acid, and 3,9-bis(2-carboxyethyl)-2,4,8,10-tetraoxaspiro[5.5]undecane; aliphatic dials such as 1,5-pentanediol, 3-methyl-1,5-pentanediol, 1,6-hexanediol, 1,7-pentanediol, 2,5-hexanediol, 1,8-octanediol, 1,9-nonanediol, neopentyl glycol, cyclohexanediol and derivatives thereof, decahydronaphthalene dimethanol and derivatives thereof, norbornene dimethanol and derivatives thereof, tricyclodecane dimethanol and derivatives thereof, pentacyclododecane dimethanol, triethylene glycol, dipropylene glycol, dibutylene glycol, 5-methylol-5-ethyl-2-(1,1-dimethyl-2-hydroxyethyl)-1,3-dioxane, and 3,9-bis(1,1-dimethyl-2-hydroxyethyl)-2,4,8,10-tetraoxaspiro[5.5]undecane; polyether compounds such as polyethylene glycol, polypropylene glycol, and polybutylene glycol; and aliphatic hydroxycarboxylic acids such as 2-hydroxyhexadecanoic acid and 12-hydroxystearic acid. Of those, preferred are azelaic acid, sebacic acid, 3-methyl-1,5-pentanediol, 1,6-hexanediol, and triethylene glycol, more preferred are azelaic acid, sebacic acid, and triethylene glycol, and most preferred are azelaic acid.

The total of the constitutional units (A), (B), and (C) in the polyester resin accounts for 75 mol % or more of all constitutional units in the polyester resin, or preferably 90 mol % or more. When the total of the constitutional units (A), (B), and (C) accounts for 75 mol % or more of all constitutional units in the polyester resin, a resin composition excellent in vibration dumping performance, formability, toughness, and other physical properties can be provided.

When the total of the constitutional units (A), (B), and (C) accounts for 75 mol or more of all constitutional units in the polyester resin, there can be used any of other dicarboxylic acids, diols, hydroxycarboxylic acids, polyvalent carboxylic acids, and polyhydric alcohols all of which have been known until now.

Specific examples of the dicarboxylic acids, diols, hydroxycarboxylic acids, polyvalent carboxylic acids, and polyhydric alcohols other than the constitutional units (A), (B), and (C) include: aliphatic dicarboxylic acids, aliphatic diols, and aliphatic hydroxycarboxylic acids each having less than 5 carbon atoms such as 1,2-propylene glycol, 1,3-propanediol, 2-methyl-1,3-propanediol, 2-methyl-1,2-propanediol, 1,3-butylene glycol, diethylene glycol, and hydroxyacetatic acid; aromatic diols such as m-xylene glycol, and tetralin dimethanol and derivatives thereof; aromatic hydroxycarboxylic acids such as hydroxybenzoic acid, dihydroxybenzoic acid, hydroxyisophthalic acid, 2,4-dihydroxyacetophenone, 4-hydroxyphthalic acid, and 4,4'-bis(p-hydroxyphenyl)pentanoic acid; and trivalent or more polyvalent carboxylic acids, polyhydric alcohols, and polyvalent hydroxycarboxylic acid such as trimellitic acid, trimesic acid, pyromellitic acid, tricarballylic acid, glycerin, trimethylolpropane, and pentaerythritol.

The polyester resin to be used in the present invention needs to have an intrinsic viscosity, which is measured at 25° C. in a mixed solvent of tetrachloroethane and phenol at amass ratio of 1 to 1, of 0.2 to 2.0 dL/g, and have a calorie of crystallization exotherm peak under temperature drop conditions, which is measured by a differential scanning calorimeter, of 5 J/g or less. The case where the above-mentioned requirements are not satisfied is not preferred, because vibration dumping performance is deteriorated.

There is no limitation in the method of producing the polyester resin, and conventionally known methods can be employed. In general, the polyester resin is produced by polycondensation of monomers as materials. For example, transesterification or direct esterification conducted by a melt polymerization method or a solution polymerization method can be mentioned. In those methods, there may be used conventionally known transesterification catalysts, esterification catalysts, etherification inhibitors, polymerization catalysts used for polymerization, and stabilizers such as heat stabilizers and light stabilizers, and polymerization adjusters.

Examples of the transesterification catalysts include compounds containing metals such as manganese, cobalt, zinc, titanium, and calcium. Further, examples of the esterification catalysts include compounds containing metals such as manganese, cobalt, zinc, titanium, and calcium. In addition, examples of the etherification inhibitors include amine compounds.

As polycondensation catalysts, there are exemplified compounds containing metals such as germanium, antimony, tin, and titanium (e.g., germanium(IV) oxide, antimony(III) oxide, triphenylstibine, antimony(III) acetate, tin(II) oxide, and titanates such as titanium(IV) tetrabutoxide, titanium(IV) tetraisopropoxide, and titanium(IV) bis(acetylacetonato)diisopropoxide). It is also effective to add, as a heat stabilizer, various phosphorus compounds such as phosphoric acid, phosphorous acid, and phenylphosphonic acid. In addition, light stabilizers, antistatic agents, lubricants, antioxidants, mold release agents, or the like may be added.

Examples of the dicarboxylic acid components which may be used as a material include the dicarboxylic acids from which the dicarboxylic acid constitutional units are derived, and dicarboxylic acid derivatives thereof such as dicarboxylic acid esters, dicarboxylic acid chlorides, active acyl derivatives, and dinitriles.

It is necessary to disperse a specific filler in the resin composition of the present invention in order to enhance the ability to absorb vibration energy of the above-mentioned polyester resin. Further, in that case, it is necessary that the maximum value of the loss elastic modulus of the resin composition is $5 \times 10^8$ [N/m$^2$] or more, or more preferably $8 \times 10^8$ [N/m$^2$] or more. The case where the above-mentioned requirement is not satisfied is not preferred, because when the resin composition is used as a vibration damping material, the vibration damping material is low in vibration dumping performance.

It should be noted that the maximum value of a loss elastic modulus is measured as follows. That is, a resin composition is formed by heat pressing at 200° C. to 220° C. into a sheet having a thickness of about 1 mm, a test piece of 5 mm by 25 mm by 1 mm is produced from the sheet obtained, and the test piece is subjected to measurement under the conditions of an evaluation frequency of 13 Hz and a measurement temperature range of −20° C. to 150° C. As a result, the maximum value of a loss elastic modulus in the measurement temperature range is obtained.

In the resin composition of the present invention, a flake-like or plate-like filler (D) and a filler (E) made of a particulate metal oxide are dispersed as the filler.

Examples of the flake-like or plate-like filler (D) include mica flakes, glass chips, sericite, graphite, talc, aluminum flakes, boron nitride, molybdenum disulfide, and black lead. Of those, mica flakes are more preferred because high vibration dumping performance is obtained.

Examples of the filler (E) made of a particulate metal oxide include particulate titanium dioxide, zinc oxide, calcium oxide, iron oxide, aluminum oxide, and magnesium oxide. Of those, titanium dioxide, zinc oxide, and calcium oxide are preferred and titanium dioxide is more preferred, because any of those compounds further enhances the ability to absorb vibration energy, thereby enhancing vibration dumping performance.

The content of the flake-like or plate-like filler (D) is 18 to 70 mass % with respect to the whole resin composition, preferably 40 to 70 mass %, or more preferably 55 to 70 mass %. When the content is less than 18 mass %, enhancement of vibration dumping performance is not effectively exhibited even if the flake-like or plate-like filler (D) is dispersed. When the content is more than 70 mass %, the formability becomes insufficient.

The content of the filler (E) made of a particulate metal oxide is 2 to 20 mass % respect to the whole resin composition, or preferably 5 to 18 mass %. When the content is less than 2 mass %, the effect of the addition is small. When the content is more than 20 mass %, the formability and toughness decline, and in order to maintain the formability and toughness, the content of the flake-like or plate-like filler must be kept low, resulting in the decline in vibration dumping performance.

The total content of the fillers (D) and (E) is 20 to 80 mass % with respect to the whole resin composition, preferably 40 to 80 mass %, or more preferably 60 to 80 mass %. When the total content is less than 20 mass %, enhancement of vibration dumping performance is not effectively exhibited even if the fillers are dispersed. When the total content is more than 80 mass %, the formability becomes insufficient.

In order to obtain the resin composition for a vibration damping material of the present invention, it is necessary to add, to a polyester resin, the flake-like or plate-like filler (D) and the particulate filler (E) made of a metal oxide. The fillers to be added are not limited to the above-mentioned fillers. If necessary, other different kinds of fillers can be used in combination.

Specific examples of the fillers other than the fillers (D) and (E) include: fibrous fillers, for example, a glass fiber, an alumina fiber, a silicon carbide fiber, a ceramic fiber, a zinc oxide whisker, and an aluminum borate whisker; and particulate fillers, for example, wollastonite, zeolite, clay, pyrophyllite, bentonite, montmorillonite, and metallosilicates including alumino silicate, silicates/silicon oxides such as silicon dioxide and metal silicate compounds, carbonates such as calcium carbonate, magnesium carbonate, and dolomite, sulfates such as calcium sulfate and barium sulfate, hydroxides such as magnesium hydroxide, calcium hydroxide, and aluminum hydroxide, metal powders such as nickel flake, iron powder, lead powder, and copper powder, glass beads, ceramic beads, silicon carbide, and carbon powder. In addition, the kind of those fillers is not limited to the foregoing.

The resin composition of the present invention is a resin composition mainly formed of a polyester resin and a filler. However, the resin composition is not limited to one formed of only a polyester resin and a filler. If necessary, one or more kinds of additives such as dispersants, compatibilizers, surfactants, antistatic agents, lubricants, plasticizers, flame retardants, crosslinking agents, antioxidants, anti-aging agents, weather-resisting agents, heat-resisting agents, processing aids, brighteners, foaming agents, and foaming aids may be added, as long as the effects of the present invention are not inhibited.

Further, for example, the resin composition of the present invention may be blended with other resins including polyester resins other than those defined above, or may be subjected to a surface treatment after having been formed into shape, as long as the effects of the present invention are not inhibited.

The resin composition of the present invention is obtained by dispersing a flake-like or plate-like filler (D) and a filler (D) made of a particulate metal oxide in a polyester resin, and a conventionally known method can be used for the mixture thereof. For example, a melt-mixing method using an apparatus such as a heat roll, a Banbury mixer, a twin-screw kneader, or an extruder is mentioned. Alternatively, a method involving dissolving or swelling a polyester resin in a solvent, dispersing a filler, and then drying the resultant, and a method involving mixing the respective components in a fine powder form may also be adopted. It should be noted that the addition method of the filler and additives, etc., the addition order thereof, and the like are not particularly limited.

The vibration damping material including the resin composition of the present invention can be formed into or processed into an injection-molded product, a sheet, a film, a fiber, a container, a foam, an adhesive, a coating, a constrained vibration damping sheet, an unconstrained vibration damping sheet, and the like. The formed and processed products can be applied to a vehicle, a railway car, aircraft, a household appliance, an OA apparatus, a precision apparatus, a building machine, a construction/building, shoes, a sport gear, and the like, and suitably used as a vibration isolator, a vibration damper, and a sound absorber/insulator.

EXAMPLES

Next, the present invention is specifically described by way of examples, but the present invention is not limited to the following examples.

In the examples and comparative examples, the polyester resin and the resin composition were measured and evaluated according to the following methods.

(1) Composition of Constitutional Units of Polyester Resin

The composition was calculated from a ratio of integrated values of 400 MHz-$^1$H-NMR spectra.

(2) Intrinsic Viscosity of Polyester Resin [η]

The intrinsic viscosity of a polyester resin [η] was measured with a Ubbelohde viscometer after dissolving the polyester resin in a mixed solvent of tetrachloroethane and phenol at a mass ratio of 1 to 1, and keeping the resultant at 25° C.

(3) Calorie of Crystallization Exotherm Peak Under Temperature Drop Conditions

The calorie of crystallization exotherm peak under temperature drop conditions of the polyester resin was measured by a differential scanning calorimeter "DSC-60" manufactured by Shimadzu Corporation. About 10 mg of a sample were placed in an unsealed container made of aluminium. Then, in a nitrogen gas flow (50 ml/min), the sample was heated to 150° C. at a temperature rise rate of 10° C./min, held at 150° C. for 1 minute, and then cooled at a temperature drop rate of 10° C./min. The calorie was calculated from the area of the exotherm peak that appeared during the temperature dropping.

(4) Loss Factor

A resin composition was formed by hot pressing at 200° C. to 220° C. into a sheet having a thickness of about 1 mm. A piece of 10 mm by 150 mm was cut out from the sheet obtained, and was pressure-bonded to a 1 mm-thick substrate (aluminum alloy A5052) by heat pressing at 200° C. to 220° C., to thereby produce an unconstrained vibration damping steel plate. By using a loss factor tester (manufactured by Ono Sokki Co., Ltd.), the vibration damping steel plate obtained was tested for the loss factor at the 500 Hz anti-resonance point in the measurement temperature range of 0° C. to 80° C. by a central exciting method.

The vibration damping performance was evaluated by comparing the maximum value of the loss factor obtained in the above-mentioned measurement temperature range and a temperature region having a loss factor of 0.1 or more.

It should be noted that the larger the loss factor is, the higher the vibration damping performance is, and a material in which the loss factor exceeds 0.1 is considered to exhibit high vibration damping performance.

(5) Loss Elastic Modulus

A resin composition was formed by heat pressing at 200° C. to 220° C. into a sheet having a thickness of about 1 mm. A test piece of 5 mm by 25 mm by 1 mm was produced from the sheet obtained, and the test piece was subjected to measurement at an evaluation frequency of 13 Hz using RHEOLOGRAPH SOLID manufactured by Toyo Seiki Seisaku-sho, Ltd. The measurement was performed under the condition of a measurement temperature range of −20° C. to 150° C. to determine the maximum value of a loss elastic modulus.

(6) Formability

A resin composition was formed by heat pressing at 200° C. to 220° C. into a sheet having a thickness of about 1 mm. A resin composition in which a filler was not sufficiently dispersed at the time of dispersing the filler or a resin composition which could not keep a sheet shape after undergoing pressing was evaluated as x, and other resin compositions were evaluated as ○.

(7) Toughness

A resin composition was formed by heat pressing at 200° C. to 220° C. into a sheet having a thickness of about 1 mm. A test piece of 10 mm by 120 mm was produced from the sheet obtained. A bend tester for measuring mechanical physical properties (manufactured by TOYO BALDWIN CO., Ltd.) was used, the test piece was set in the state where the supporting distance of the test piece was 90 mm, and a load was applied to deform the test piece until the travel distance of a load cell became 10 mm from the contact point with the test piece.

The test piece deformed was observed visually. A test piece having no crack and break was evaluated as ○, and other test pieces were evaluated as x.

Production Examples 1 to 12

Production of Resins 1 to 12

To a 500-ml glass flask equipped with a heating device, a stirring blade, a dephlegmator, a trap, a thermometer, and a nitrogen-introducing tube, the materials for a polyester resin described below were added in substantial amounts to attain such compositions of the dicarboxylic acid constitutional unit and the diol constitutional unit as shown in Table 1. It should be noted that the total amount of dicarboxylic acids to be loaded was set to 0.8 mol and the loading ratio of diols/dicarboxylic acids was set to 1.5.

The temperature of the materials loaded was raised to 220° C. under normal pressure under a nitrogen atmosphere, and the materials were subjected to an esterification reaction for 2.5 hours or longer. After it was confirmed that the reaction conversion rate of the dicarboxylic acids reached 90 mol % or more under the monitoring of the amount of condensed water to be removed, titanium(IV) tetrabutoxide was added at 50 ppm (concentration of titanium with respect to the total mass of an initial condensation reaction product obtained by eliminating the mass of condensed water from the mass of the total loaded materials). While the diol component in the mixture was being removed out of the system by subjecting the mixture to gradual temperature rise and pressure reduction, a final polycondensation reaction was performed at 240° C. to 250° C. at 1.5 kPa or lower. The viscosity and stirring torque value of the reaction mixture gradually rose, and then the reaction was stopped when the reaction mixture showed an appropriate viscosity or when the removal of diols was stopped.

Table 1 shows physical properties of the polyester resins (Resins 1 to 12) obtained, that is, (2) the intrinsic viscosity of the polyester resin [η] and (3) the calorie of the crystallization exotherm peak under temperature drop conditions of the polyester resin.

It should be noted that the following materials were used for producing the polyester resins (Resins 1 to 12). (A), (B), and (C) represent the symbols of respective constitutional units in the present invention.

Isophthalic acid (A): manufactured by A. G. International Chemical Co., Inc.
Terephthalic acid (A): manufactured by Mizushima Aroma Co., Ltd.
Azelaic acid (C): EMEROX 1144 manufactured by Cognis Oleochemials
Sebacic acid (C): manufactured by Hokoku Corporation
Ethylene glycol (B): manufactured by Maruzen Petrochemical Co., Ltd.
Triethylene glycol (C): manufactured by Maruzen Petrochemical Co., Ltd.
2-methyl-1,3-propanediol: manufactured by Dairen Chemical Corporation
1,4-butanediol: manufactured by KANTO CHEMICAL CO., INC.

Example 1

To Resin 1, kneaded were titanium dioxide (trade name: TIPAQUE CR-80, manufactured by ISHIHARA SANGYO KAISHA, LTD.), mica flakes (trade name: CS-060DC, manufactured by Yamaguchi Mica Co., Ltd.), and carbon powders (trade name: Ketjenblack EC, manufactured by Ketjenblack International Co., Ltd.) so that the composition for a vibration damping material of Example 1 shown in Table 1 was attained. Kneading was performed at 220° C. using a twin-screw kneader. Table 1 shows the performance evaluation results of the vibration damping materials obtained.

Examples 2 to 5

To Resins 2 to 5, kneaded were titanium dioxide, mica flakes, and carbon powders each used in Example 1 so that each of the compositions for a vibration damping material of Examples 2 to 5 shown in Table 1 was attained. Kneading was performed at 200° C. to 220° C. using a twin-screw kneader. Table 1 shows the performance evaluation results of the vibration damping materials obtained.

Comparative Examples 1 to 7

To Resins 6 to 12, kneaded were titanium dioxide, mica flakes, and carbon powders each used in Example 1 so that each of the compositions for a vibration damping material of Comparative Examples 1 to 7 shown in Table 1 was attained. Kneading was performed at 200° C. to 250° C. using a twin-screw kneader. Table 1 shows the performance evaluation results of the vibration damping materials obtained.

Examples 6 to 14

To Resin 1, kneaded were titanium dioxide used in Example 1, iron oxide (trade name: Iron Oxide, manufactured by JFE Chemical Corporation), magnesium oxide (trade name: Kyowa Mag, manufactured by Kyowa Chemical Industry Co., Ltd.), zinc oxide (trade name: Zinc Oxide Type 1, manufactured by Sakai Chemical Industry Co., Ltd.), aluminum oxide (trade name: ADMAFINE, manufactured by Admatechs Co., Ltd.), calcium oxide (trade name: Calcium Oxide 3N, manufactured by KANTO CHEMICAL CO., INC), and mica flakes so that each of the compositions for a vibration damping material shown in Table 2 was attained. Kneading was performed at 220° C. using a twin-screw kneader. Table 2 shows the performance evaluation results of the vibration damping materials obtained.

Comparative Examples 8 to 14

To Resin 1, kneaded were titanium dioxide, mica flakes, and carbon powders each used in Example 1 so that each of the compositions for a vibration damping material shown in Table 3 was attained. Kneading was performed at 220° C. using a twin-screw kneader. Table 3 shows the performance evaluation results of the vibration damping materials obtained.

TABLE 1

|  | Example 1 | Example 2 | Example 3 | Example 4 | Example 5 | Comparative Example 1 | Comparative Example 2 |
|---|---|---|---|---|---|---|---|
| (1) Polyester resin Composition of dicarboxylic acid constitutional unit (mol %) | Resin 1 | Resin 2 | Resin 3 | Resin 4 | Resin 5 | Resin 6 | Resin 7 |
| Terephthalic acid (A) | 7.2 | 8 | 7 | 10 | 7 | 70 | 10 |
| Isophthalic acid (A) | 64.8 | 72 | 63 | 90 | 63 |  | 90 |
| Azelaic acid (C) | 28.0 | 20 | 30 |  |  |  |  |
| Sebacic acid (C) |  |  |  |  | 30 | 30 |  |
| Composition of diol constitutional unit (mol %) |  |  |  |  |  |  |  |
| Ethylene glycol (B) | 100 | 100 | 100 | 70 | 100 | 100 | 100 |
| Triethylene glycol (C) |  |  |  | 30 |  |  |  |
| 1,4-butanediol |  |  |  |  |  |  |  |
| 2-methyl-1,3-propanediol |  |  |  |  |  |  |  |
| Concentration of constitutional unit (C) (mol %) | 14.0 | 10.0 | 15.0 | 15.0 | 15.0 | 15.0 |  |
| (2) Intrinsic viscosity of polyester resin (dL/g) | 0.92 | 0.85 | 0.65 | 0.99 | 0.41 | 0.94 | 0.69 |
| (3) Calorie of crystallization exotherm peak under temperature drop conditions (J/g) | 0 | 0 | 0 | 0 | 0 | 0 | 10 |
| Composition of vibration damping material (wt %) |  |  |  |  |  |  |  |
| Polyester resin | 24.8 | 22.5 | 22.5 | 22.5 | 24.8 | 24.8 | 36.0 |
| Mica flake (D) | 60.0 | 60.0 | 60.0 | 60.0 | 60.0 | 60.0 | 60.0 |

TABLE 1-continued

|  |  |  |  |  |  |  |  |
|---|---|---|---|---|---|---|---|
| $TiO_2$ (E) | 15.0 | 17.5 | 17.5 | 17.5 | 15.0 | 15.0 |  |
| Carbon powder | 0.2 |  |  |  | 0.2 | 0.2 | 4.0 |
| Performance of vibration damping material |  |  |  |  |  |  |  |
| (4) Maximum value of loss factor (—) | 0.33 | 0.23 | 0.27 | 0.27 | 0.34 | 0.06 | 0.29 |
| Temperature region showing loss factor of 0.1 or more (°C.) | 27-61 | 40-76 | 25-61 | 36-77 | 22-58 | — | 55-80 |
| (5) Maximum value of loss factor elastic modulus (N/m$^2$) | $1.0 \times 10^9$ | $9.1 \times 10^8$ | $1.1 \times 10^9$ | $8.9 \times 10^8$ | $1.6 \times 10^9$ | $3.1 \times 10^8$ | $1.7 \times 10^9$ |
| (6) Formability | ○ | ○ | ○ | ○ | ○ | ○ | ○ |
| (7) Toughness | ○ | ○ | ○ | ○ | ○ | x | x |

|  | Comparative Example 3 | Comparative Example 4 | Comparative Example 5 | Comparative Example 6 | Comparative Example 7 |
|---|---|---|---|---|---|
| (1) Polyester resin | Resin 8 | Resin 9 | Resin 10 | Resin 11 | Resin 12 |
| Composition of dicarboxylic acid constitutional unit (mol %) |  |  |  |  |  |
| Terephthalic acid (A) | 100 |  |  |  | 7.2 |
| Isophthalic acid (A) |  | 100 | 67 | 85 | 64.8 |
| Azelaic acid (C) |  |  | 33 | 15 | 28.0 |
| Sebacic acid (C) |  |  |  |  |  |
| Composition of diol constitutional unit (mol %) |  |  |  |  |  |
| Ethylene glycol (B) | 100 |  |  |  |  |
| Triethylene glycol (C) |  |  |  |  |  |
| 1,4-butanediol |  |  |  | 100 | 100 |
| 2-methyl-1,3-propanediol |  | 100 | 100 |  |  |
| Concentration of constitutional unit (C) (mol %) |  |  | 16.5 | 7.5 | 14.0 |
| (2) Intrinsic viscosity of polyester resin (dL/g) | 0.85 | 0.73 | 0.61 | 0.71 |  |
| (3) Calorie of crystallization exotherm peak under temperature drop conditions (J/g) | 38 | 0 | 0 | 3 | 28 |
| Composition of vibration damping material (wt %) |  |  |  |  |  |
| Polyester resin | 36.0 | 36.0 | 36.0 | 30.0 | 24.8 |
| Mica flake (D) | 60.0 | 60.0 | 60.0 | 60.0 | 60.0 |
| $TiO_2$ (E) |  |  |  | 10.0 | 15.0 |
| Carbon powder | 4.0 | 4.0 | 4.0 |  | 0.2 |
| Performance of vibration damping material |  |  |  |  |  |
| (4) Maximum value of loss factor (—) | 0.02 | 0.3 | 0.31 | 0.11 | 0.06 |
| Temperature region showing loss factor of 0.1 or more (°C.) | — | 59-80 | 10-38 | 31-44 | — |
| (5) Maximum value of loss factor elastic modulus (N/m$^2$) | $2.2 \times 10^8$ | $1.4 \times 10^9$ | $7.2 \times 10^8$ | $3.3 \times 10^8$ | $3.1 \times 10^8$ |
| (6) Formability | ○ | ○ | ○ | ○ | ○ |
| (7) Toughness | x | x | ○ | x | ○ |

TABLE 2

|  | Example 6 | Example 7 | Example 8 | Example 9 | Example 10 | Example 11 | Example 12 | Example 13 | Example 14 |
|---|---|---|---|---|---|---|---|---|---|
| Polyester resin | Resin 1 | Resin 1 | Resin 1 | Resin 1 | Resin 1 | Resin 1 | Resin 1 | Resin 1 | Resin 1 |
| Composition of vibration damping material (wt %) |  |  |  |  |  |  |  |  |  |
| Polyester resin | 35 | 30 | 25 | 20 | 25 | 25 | 25 | 25 | 25 |
| Mica flake (D) | 60 | 60 | 60 | 60 | 60 | 60 | 60 | 60 | 60 |
| $TiO_2$ (E) | 5 | 10 | 15 | 20 |  |  |  |  |  |
| $Fe_2O_3$ (E) |  |  |  |  | 15 |  |  |  |  |
| MgO (E) |  |  |  |  |  | 15 |  |  |  |
| ZnO (E) |  |  |  |  |  |  | 15 |  |  |
| $Al_2O_3$ (E) |  |  |  |  |  |  |  | 15 |  |
| CaO (E) |  |  |  |  |  |  |  |  | 15 |

TABLE 2-continued

|  | Example 6 | Example 7 | Example 8 | Example 9 | Example 10 | Example 11 | Example 12 | Example 13 | Example 14 |
|---|---|---|---|---|---|---|---|---|---|
| Carbon powder |  |  |  |  |  |  |  |  |  |
| Performance of vibration damping material |  |  |  |  |  |  |  |  |  |
| (4) Maximum value of loss factor (—) | 0.32 | 0.33 | 0.35 | 0.23 | 0.23 | 0.27 | 0.35 | 0.31 | 0.21 |
| Temperature region showing loss factor of 0.1 or more (° C.) | 24-52 | 29-60 | 28-57 | 27-66 | 33-62 | 32-70 | 31-65 | 61-67 | 36-67 |
| (5) Maximum value of loss factor elastic modulus (N/m$^2$) | $1.2 \times 10^9$ | $1.3 \times 10^9$ | $1.4 \times 10^9$ | $8.2 \times 10^8$ | $1.2 \times 10^9$ | $1.3 \times 10^9$ | $1.4 \times 10^9$ | $1.7 \times 10^9$ | $8.1 \times 10^9$ |
| (6) Formability | ○ | ○ | ○ | ○ | ○ | ○ | ○ | ○ | ○ |
| (7) Toughness | ○ | ○ | ○ | ○ | ○ | ○ | ○ | ○ | ○ |

TABLE 3

|  | Comparative Example 8 | Comparative Example 9 | Comparative Example 10 | Comparative Example 11 | Comparative Example 12 | Comparative Example 13 | Comparative Example 14 | Comparative Example 15 | Comparative Example 16 |
|---|---|---|---|---|---|---|---|---|---|
| Polyester resin | Resin 1 | Resin 1 | Resin 1 | Resin 1 | Resin 1 | Resin 7 | Resin 8 | Resin 9 | Resin 10 |
| Component of vibration damping material (wt %) |  |  |  |  |  |  |  |  |  |
| Polyester resin | 85 | 70 | 40 | 10 | 15 | 24.8 | 24.8 | 24.8 | 25 |
| Mica flake (D) | 15 | 30 | 60 | 90 | 60 | 60.0 | 60.0 | 60.0 | 60 |
| TiO$_2$ (E) |  |  |  |  | 25 | 15.0 | 15.0 | 15.0 | 15 |
| Carbon powder |  |  |  |  |  | 0.2 | 0.2 | 0.2 |  |
| Performance of vibration damping material |  |  |  |  |  |  |  |  |  |
| (4) Maximum value of loss factor (—) | 0.08 | 0.12 | 0.25 | — | — | — | — | 0.31 | 0.30 |
| Temperature region showing loss factor of 0.1 or more (° C.) | — | 28-35 | 24-47 | — | — | — | — | 60-80 | 10-44 |
| (5) Maximum value of loss factor elastic modulus (N/m$^2$) | $6.8 \times 10^8$ | $9.4 \times 10^8$ | $1.4 \times 10^9$ | — | — | — | — | $1.4 \times 10^9$ | $1.9 \times 10^9$ |
| (6) Formability | ○ | ○ | ○ | x | x | x | x | ○ | ○ |
| (7) Toughness | ○ | ○ | ○ | — | — | — | — | x | ○ |

Table 1 and Table 2 show that Examples 1 to 14 provide excellent vibration damping materials having sufficient toughness and formability, even though each of the examples exhibits a high loss factor, and has a temperature region showing a loss factor of 0.1 or more in a relatively high temperature range extending to 50° C. or more.

On the other hand, Table 1 shows that Comparative Example 1 which does not include isophthalic acid as the aromatic dicarboxylic acid constitutional unit (A) in the polyester resin exhibits a lower maximum value of a loss factor, and hence Comparative Example 1 is not suitable as a vibration damping material.

Further, Comparative Examples 2 to 5 do not include a filler (E) made of a particulate metal oxide, and Comparative Example 2 does not include the component (C) such as an aliphatic dicarboxylic acid constitutional unit having 5 or more carbon atoms, either. Those comparative examples exhibit a sufficiently high maximum value of a loss factor, but they have insufficient toughness as materials. Thus, those comparative examples are not suitable as vibration damping materials. In addition, Comparative Example 3 does not include isophthalic acid, either, and then exhibits a lower maximum value of a loss factor and has insufficient toughness. Thus, Comparative Example 3 is not suitable as a vibration damping material. Comparative Example 4 does not include ethylene glycol (B) and the component (C) such as an aliphatic dicarboxylic acid constitutional unit having 5 or more carbon atoms, either. Comparative Example 4 exhibits a sufficiently high maximum value of a loss factor but has insufficient toughness as a material. Thus, Comparative Example 4 is not suitable as a vibration damping material. Comparative Example 5 does not include ethylene glycol (B) as the diol component, and does not have any problems in formability, toughness, and vibration dumping performance at around room temperature, but is inferior in vibration dumping performance in a higher temperature region.

Comparative Examples 6 and 7 are the case where ethylene glycol (B) was not used, but 1,4-butanediol was used. Comparative Example 6 exhibits a lower maximum value of a loss factor and has insufficient toughness, and hence is not suitable as a vibration damping material. Meanwhile, in Comparative Example 7, the amounts of the component (C) such as an aliphatic dicarboxylic acid constitutional unit having 5 or more carbon atoms and the filler (E) made of a particulate metal oxide were increased. Comparative Example 7 has toughness but exhibits a lower maximum value of a loss factor, and hence is not suitable as a vibration damping material.

In addition, Table 3 shows that Comparative Examples 8 to 10 that do not include any filler (E) made of a particulate metal oxide as a filler exhibit a lower maximum value of a loss factor, and Comparative Examples 11 and 12 in which the total amount of the fillers (D) and (E) exceeds 80 mass % are not formed into shape, and thus, it is impossible to measure their loss factors.

In Comparative Examples 13 to 16, the resin does not satisfy requirements specified. Even if the amount of each filler in a vibration damping material satisfies requirements, shape formation does not occur in the case where the polyester resin does not include the component (C) such as an aliphatic dicarboxylic acid constitutional unit having 5 or more carbon atoms like Comparative Example 13, and in the case where the polyester resin does not include any dicarboxylic acid constitutional unit derived from isophthalic acid like Comparative Example 14. In the case where ethylene glycol (B) is not used and the polyester resin does not include the component (C) such as an aliphatic dicarboxylic acid constitutional unit having 5 or more carbon atoms, like Comparative Example 15, toughness is not provided. In the case where the component (C) such as an aliphatic dicarboxylic acid constitutional unit having 5 or more carbon atoms is used, but ethylene glycol (B) is not used, like Comparative Example 16, toughness is provided, but the temperature at which the loss factor exceeds 0.1 does not reach 50° C.

As is evident from the foregoing examples, the vibration damping material of the present invention exhibits a high loss factor in a relatively high temperature region extending to 50° C. or more and is excellent in formability and toughness. Thus, the present invention can provide a resin composition for a vibration damping material and a vibration damping material which exert high vibration damping performance in a wide temperature region and are excellent in toughness and processability.

Industrial Applicability

The resin composition for a vibration damping material of the present invention can provide a vibration damping material which exerts high vibration damping performance in a wide temperature region and is excellent in toughness and processability. The vibration damping material is formed into or processed into an injection-molded product, a sheet, a film, a fiber, a container, a foam, an adhesive, a coating, a constrained vibration damping sheet, an unconstrained vibration damping sheet, and the like. The formed and processed products are applied to a vehicle, a railway car, aircraft, a household appliance, an OA apparatus, a precision apparatus, a building machine, a construction/building, shoes, a sport gear, and the like, and suitably used as a vibration isolator, a vibration damper, and a sound absorber/insulator.

The invention claimed is:

1. A resin composition for a vibration damping material, comprising:
    a polyester resin mainly formed of a dicarboxylic acid constitutional unit and a diol constitutional unit; and
    a filler,
    wherein:
    (1) the polyester resin contains 50 mol % or more of a dicarboxylic acid constitutional unit (A) derived from an aromatic dicarboxylic acid in all dicarboxylic acid constitutional units, and contains 70 mol % or more of a dicarboxylic acid constitutional unit derived from isophthalic acid in the dicarboxylic acid constitutional unit (A) derived from an aromatic dicarboxylic acid;
    (2) the polyester resin contains 60 mol % or more of a diol constitutional unit (B) derived from ethylene glycol in all diol constitutional units;
    (3) the polyester resin contains a constitutional unit (C) formed of an aliphatic dicarboxylic acid, an aliphatic diol, and/or an aliphatic hydroxycarboxylic acid all of which have 5 or more carbon atoms, and a total of the constitutional unit is 5 to 25 mol %;
    (4) the polyester resin contains a total of 75 mol % or more of the constitutional units (A), (B), and (C) in all constitutional units of the polyester resin;
    (5) an intrinsic viscosity of the polyester resin, which is measured at 25° C. in a mixed solvent of tetrachloroethane and phenol at a mass ratio of 1 to 1, is 0.2 to 2.0 dL/g;
    (6) a calorie of crystallization exotherm peak under temperature drop conditions of the polyester resin, which is measured by a differential scanning calorimeter, is 5 J/g or less;
    (7) the resin composition contains, as the filler, a flake-like or plate-like filler (D) and a filler (E) made of a particulate metal oxide, in which a content of the filler (D) is 18 to 70 mass %, a content of the filler (E) is 2 to 20 mass %, and a total content of the fillers (D) and (E) is 20 to 80 mass %; and
    (8) a maximum value of a loss elastic modulus of the resin composition is $5 \times 10^8$ [N/m$^2$] or more.

2. The resin composition for a vibration damping material according to claim 1, comprising 90 mol % or more of the dicarboxylic acid constitutional unit derived from isophthalic acid in the dicarboxylic acid constitutional unit (A) derived from an aromatic dicarboxylic acid.

3. The resin composition for a vibration damping material according to claim 1, wherein the constitutional unit (C) comprises one or more kinds of compounds selected from a group consisting of azelaic acid, sebacic acid, 3-methyl-1,5-pentanediol, 1,6-hexanediol, and triethylene glycol.

4. The resin composition for a vibration damping material according to claim 3, wherein the constitutional unit (C) comprises one or more kinds of compounds selected from a group consisting of azelaic acid, sebacic acid, and triethylene glycol.

5. The resin composition for a vibration damping material according to claim 4, wherein the constitutional unit (C) comprises azelaic acid.

6. The resin composition for a vibration damping material according to claim 1, comprising a total of 90 mol % or more of the constitutional units (A), (B), and (C) in all constitutional units of the polyester resin.

7. The resin composition for a vibration damping material according to claim 1, wherein the filler (D) comprises a mica flake.

8. The resin composition for a vibration damping material according to claim 1, wherein the filler (E) comprises one or more kinds of particulate metal oxides selected from a group consisting of titanium dioxide, zinc oxide, calcium oxide, iron oxide, aluminum oxide, and magnesium oxide.

9. The resin composition for a vibration damping material according to claim 8, wherein the filler (E) comprises titanium dioxide.

10. A vibration damping material, comprising the resin composition for a vibration damping material according to claim 1.

* * * * *